US012658205B2

(12) United States Patent
Hoshi et al.

(10) Patent No.:    US 12,658,205 B2
(45) Date of Patent:      Jun. 16, 2026

(54) SUSPENSION ASSEMBLY AND DISK DEVICE

(71) Applicants: Kabushiki Kaisha Toshiba, Tokyo (JP); Toshiba Electronic Devices & Storage Corporation, Tokyo (JP)

(72) Inventors: Ryogo Hoshi, Yokohama Kanagawa (JP); Takuma Kido, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/596,292

(22) Filed: Mar. 5, 2024

(65) Prior Publication Data

US 2025/0182784 A1      Jun. 5, 2025

(30) Foreign Application Priority Data

Dec. 4, 2023    (JP) ................................. 2023-204483

(51) Int. Cl.
G11B 5/48              (2006.01)
(52) U.S. Cl.
CPC ............ G11B 5/484 (2013.01); G11B 5/4833 (2013.01); G11B 5/486 (2013.01)
(58) Field of Classification Search
None
See application file for complete search history.

(56)              References Cited

U.S. PATENT DOCUMENTS

| | | | | |
|---|---|---|---|---|
| 6,967,821 | B2 * | 11/2005 | Himes | G11B 5/4826 |
| 7,336,444 | B2 * | 2/2008 | Kido | G11B 5/4826 |
| | | | | 360/244.9 |
| 7,636,222 | B1 * | 12/2009 | Dobosz | G11B 5/5569 |
| | | | | 360/265.9 |
| 8,369,046 | B2 | 2/2013 | Nojima | |
| 9,330,697 | B2 * | 5/2016 | Miller | G11B 5/4833 |
| 10,748,565 | B1 * | 8/2020 | Nakayama | G11B 5/486 |
| 10,991,388 | B1 * | 4/2021 | Yamada | G11B 5/5582 |
| 11,170,822 | B2 | 11/2021 | Nakayama et al. | |
| 2006/0227464 | A1 * | 10/2006 | Huang | G11B 5/48 |
| 2010/0277834 | A1 | 11/2010 | Nojima | |
| 2014/0085754 | A1 * | 3/2014 | Hanya | G11B 5/4813 |
| | | | | 360/244.5 |
| 2020/0279579 | A1 * | 9/2020 | Nakayama | G11B 5/4833 |
| 2021/0241802 | A1 * | 8/2021 | Nakayama | G11B 25/043 |
| 2021/0287698 | A1 * | 9/2021 | Yamada | G11B 5/4833 |
| 2023/0197110 | A1 * | 6/2023 | Nakayama | G11B 33/08 |
| | | | | 360/245.2 |

* cited by examiner

*Primary Examiner* — William J Klimowicz
(74) *Attorney, Agent, or Firm* — Kim & Stewart LLP

(57)              ABSTRACT

According to one embodiment, a suspension assembly includes a support plate, a wiring member provided on the support plate and including an elastically deformable gimbal portion including a tongue portion on which a magnetic head is mounted and an outrigger connected to the tongue portion, and a viscoelastic material filled into a gap between the outrigger and the support plate and forming a damper.

10 Claims, 10 Drawing Sheets

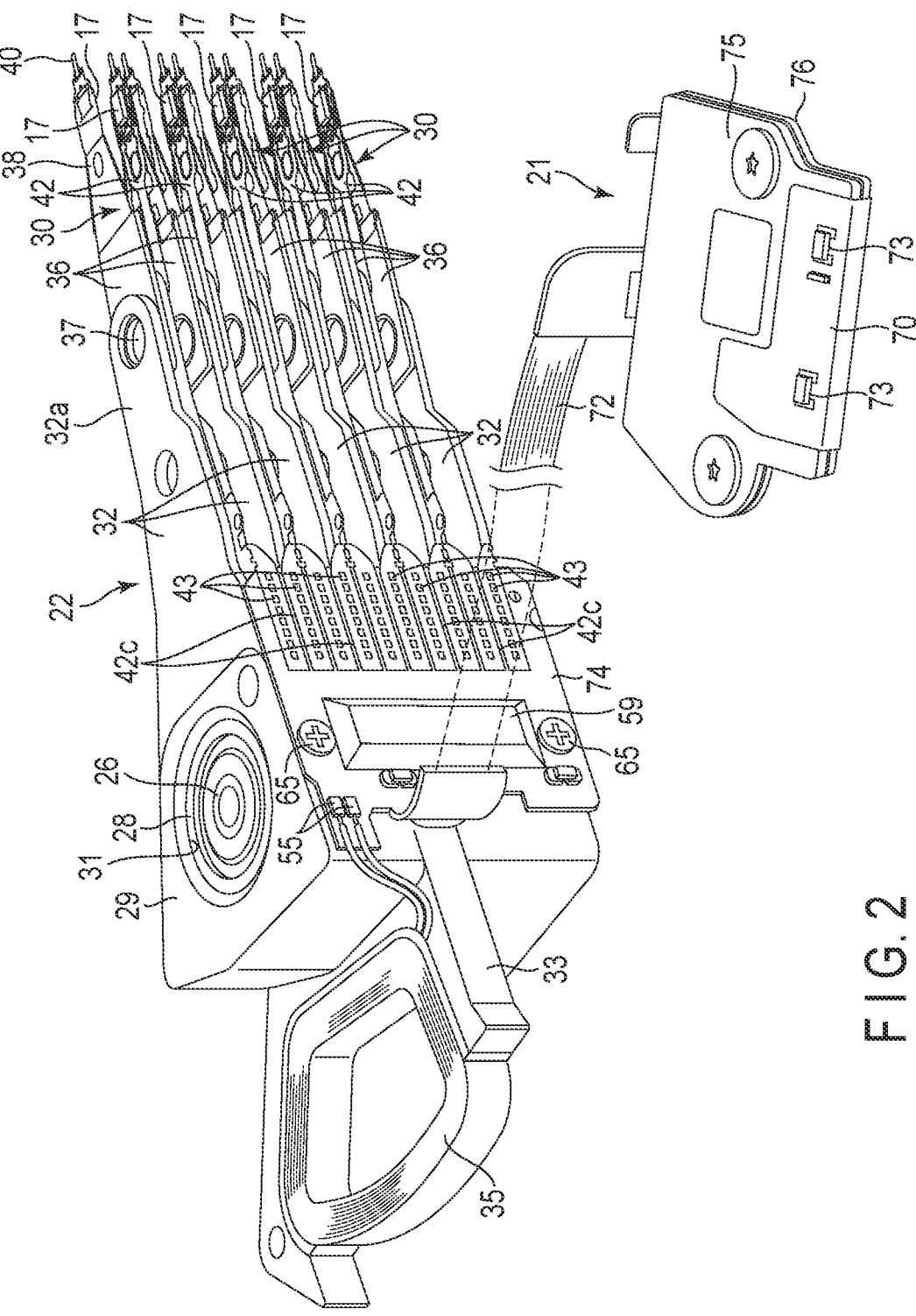
F I G. 2

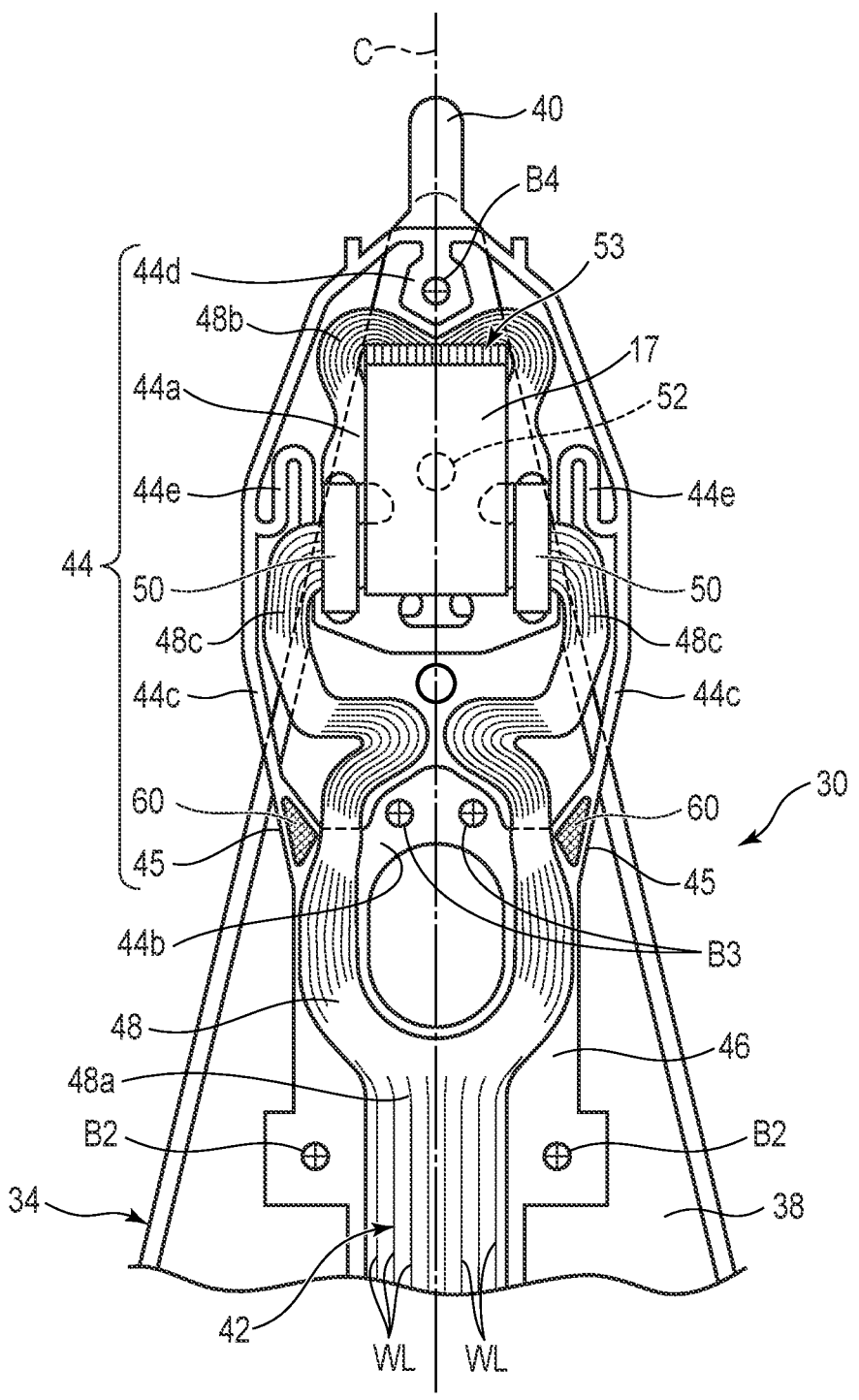
F I G. 4

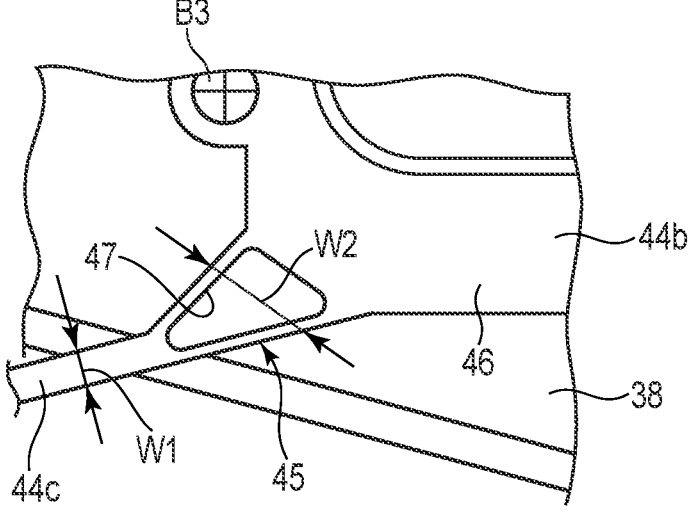
F I G. 5
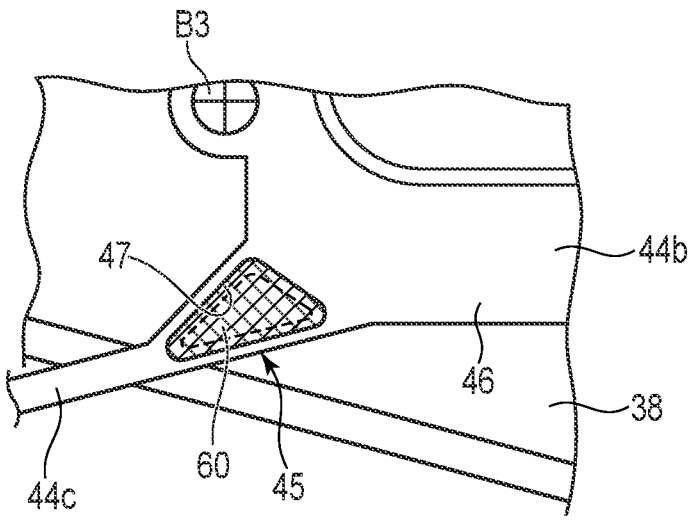
F I G. 6

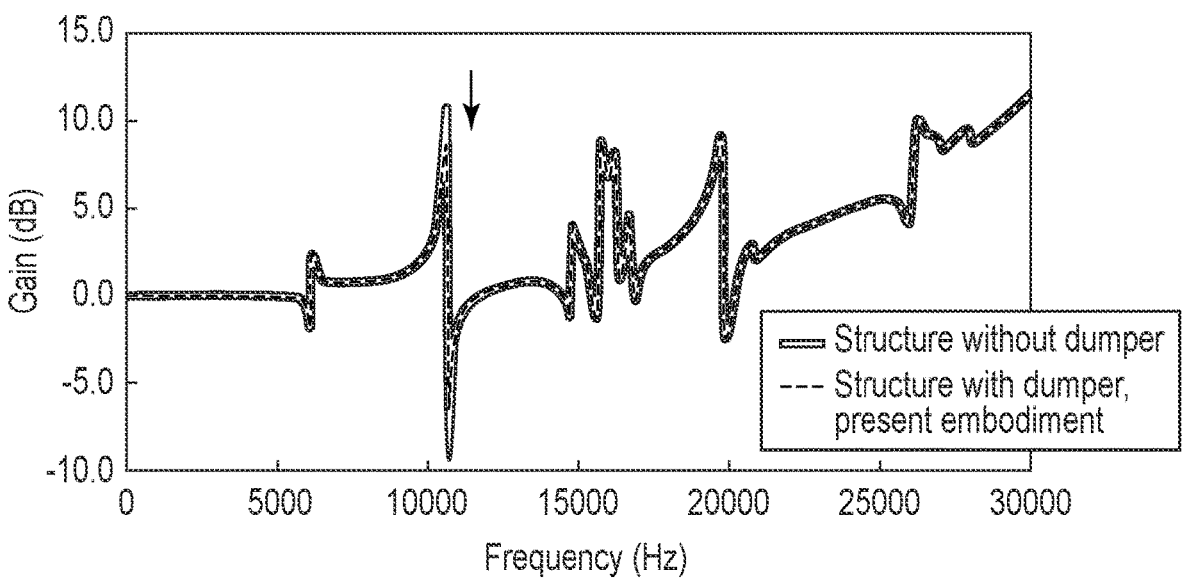
F I G. 8A
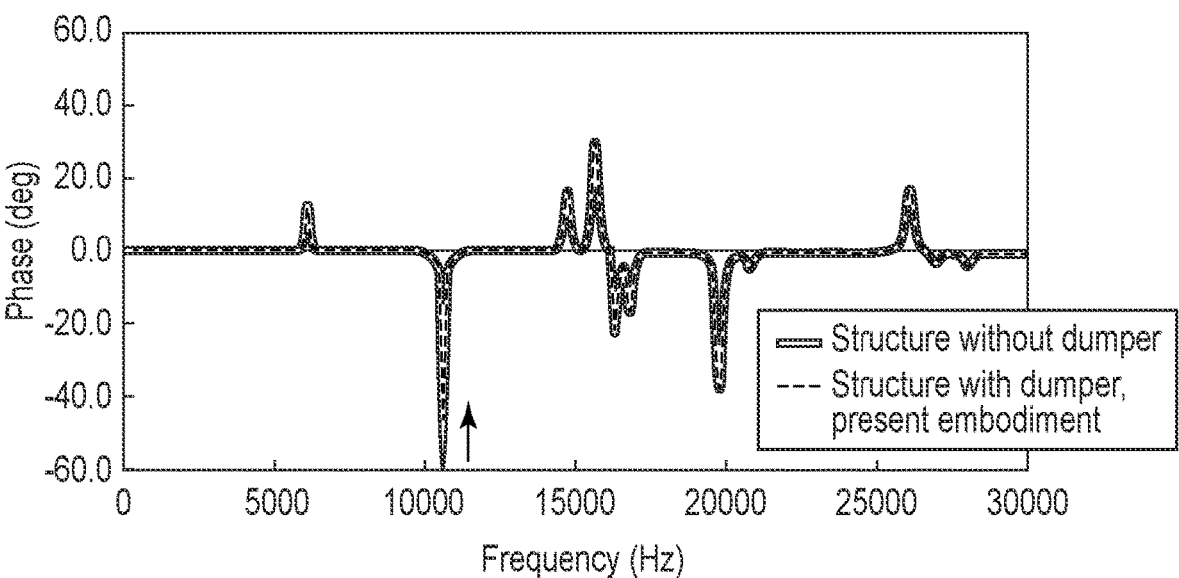
F I G. 8B

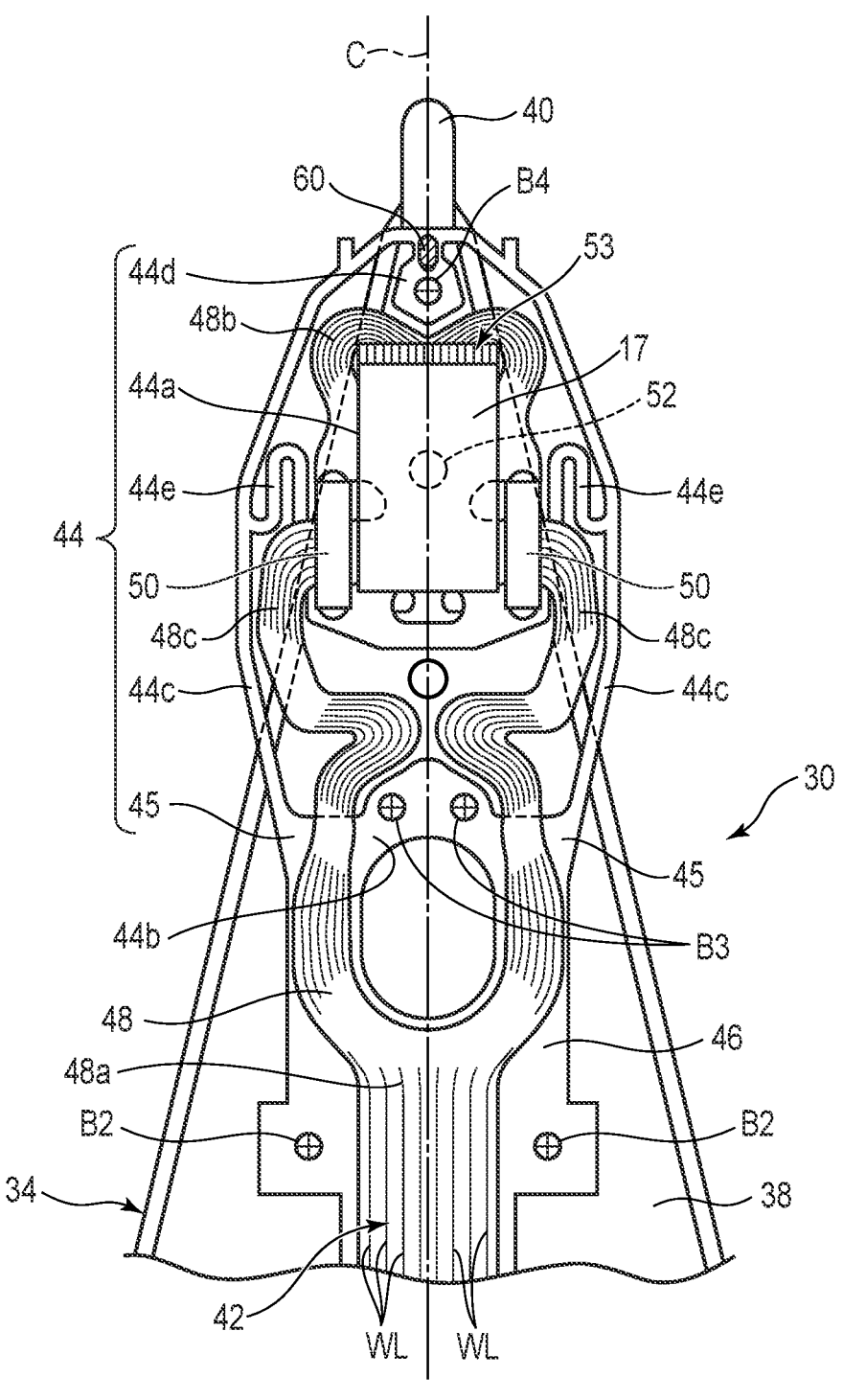
F I G. 9

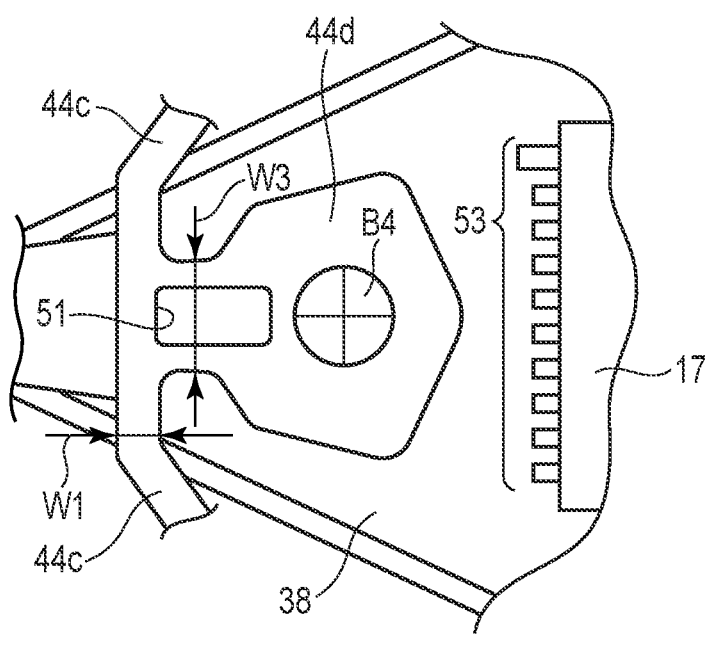
F I G. 10
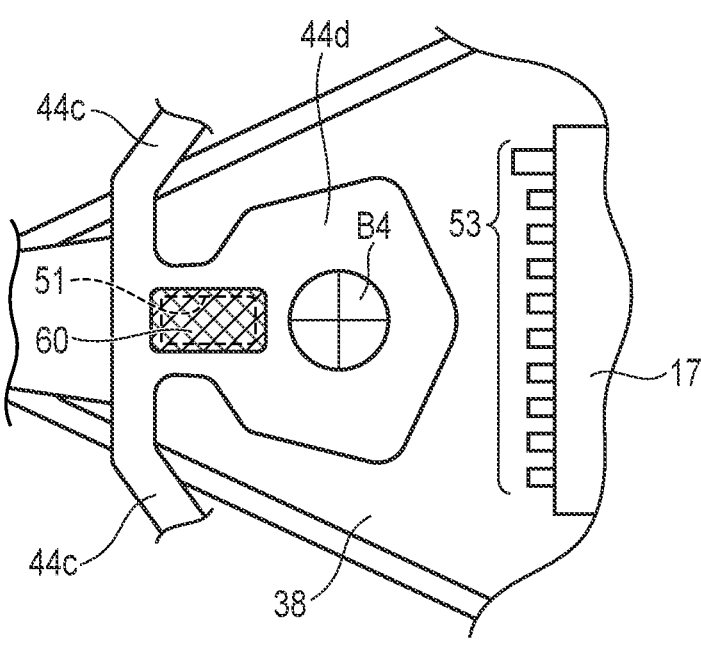
F I G. 11

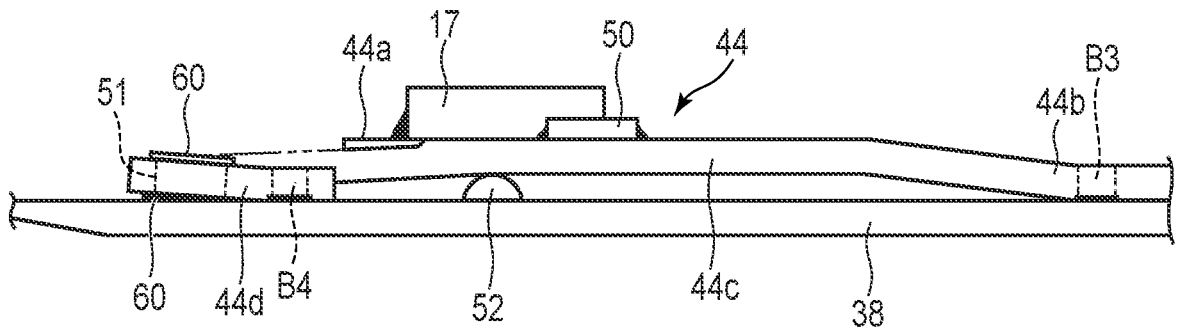
F I G. 12
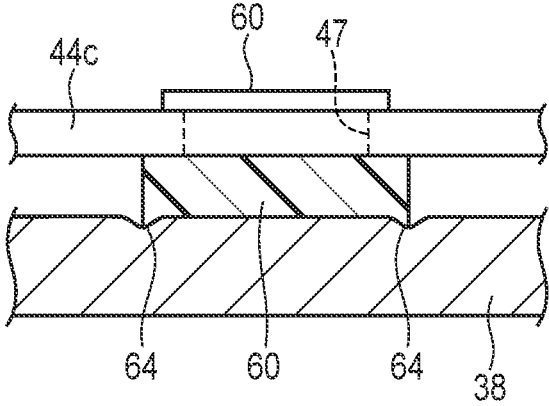
F I G. 13

SUSPENSION ASSEMBLY AND DISK DEVICE

CROSS-REFERENCE TO RELATED APPLICATIONS

This application is based upon and claims the benefit of priority from Japanese Patent Application No. 2023-204483, filed Dec. 4, 2023, the entire contents of which are incorporated herein by reference.

FIELD

Embodiments described herein relate generally to a suspension assembly and a disk device comprising the same.

BACKGROUND

As a disk device, for example, a hard disk drive (HDD) comprises a plurality of magnetic disks arranged in a housing so as to be rotatable, a plurality of magnetic heads that read and write information to and from the magnetic disks, and a head actuator that supports the magnetic heads to be movable with respect to the magnetic disks.

The head actuator includes a plurality of suspension assemblies (which may as well be referred to as gimbal assemblies) that support the magnetic heads at their distal portions. The suspension assembly includes a suspension made of a metal support plate and a flexure (wiring member) provided on the suspension. The flexure includes a gimbal portion that can be freely displaced, and a magnetic head is mounted on the gimbal portion. Further, recently, such an element as a piezoelectric element is mounted on the flexure to constitute a micro actuator.

Usually, the gimbal portion includes an elastically deformable outrigger, and the magnetic head is supported by the outrigger so as to be displaceable. In such a suspension assembly, a torsional mode occurs in the gimbal portion during the positioning operation of the magnetic head. The torsional mode is a vibration mode that generally occurs at around 10 KHz, and when it oscillates, the accuracy of positioning of the magnetic head deteriorates.

BRIEF DESCRIPTION OF THE DRAWINGS

FIG. 2 is a perspective view showing an actuator assembly of the HDD.

FIG. 4 is an enlarged plan view showing a distal end portion of the suspension assembly.

FIG. 5 is a plan view showing a proximal portion of an outrigger of the gimbal portion before filled with a viscoelastic material.

FIG. 6 is a plan view showing the proximal portion of the outrigger of the gimbal portion after filled with a viscoelastic material.

FIG. 8A is a diagram showing a comparison in vibration characteristics (frequency-gain) between the suspension assembly of this embodiment with a damper and the suspension assembly of a comparative example without a damper.

FIG. 8B is a diagram showing shows a comparison in vibration characteristics (frequency-phase) between the suspension assembly of this embodiment with a damper and a suspension assembly of a comparative example without a damper.

FIG. 9 is an enlarged plan view showing a distal end portion of a suspension assembly of an HDD according to the second embodiment.

FIG. 10 is a plan view showing a distal end portion of an outrigger of a gimbal portion before filled with a viscoelastic material in the HDD of the second embodiment.

FIG. 11 is a plan view showing the distal end portion of the outrigger of the gimbal portion after filled with a viscoelastic material in the HDD of the second embodiment.

FIG. 12 is a side view schematically showing the distal end portion of the suspension assembly and the gimbal portion in the HDD of the second embodiment.

FIG. 13 is a cross-sectional view schematically showing a fill portion of a viscoelastic material of a suspension assembly in an HDD according to the third embodiment.

DETAILED DESCRIPTION

Various embodiments will be described hereinafter with reference to the accompanying drawings. In general, according to one embodiment, a suspension assembly comprises a support plate, a wiring member provided on the support plate and comprising an elastically deformable gimbal portion including a tongue portion on which a magnetic head is mounted and an outrigger connected to the tongue portion, and a viscoelastic material filled into a gap between the outrigger and the support plate and constituting a damper.

Note that the disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Embodiment

As a disk device, a hard disk drive (HDD) according to the first embodiment will be described.

Figure 1:
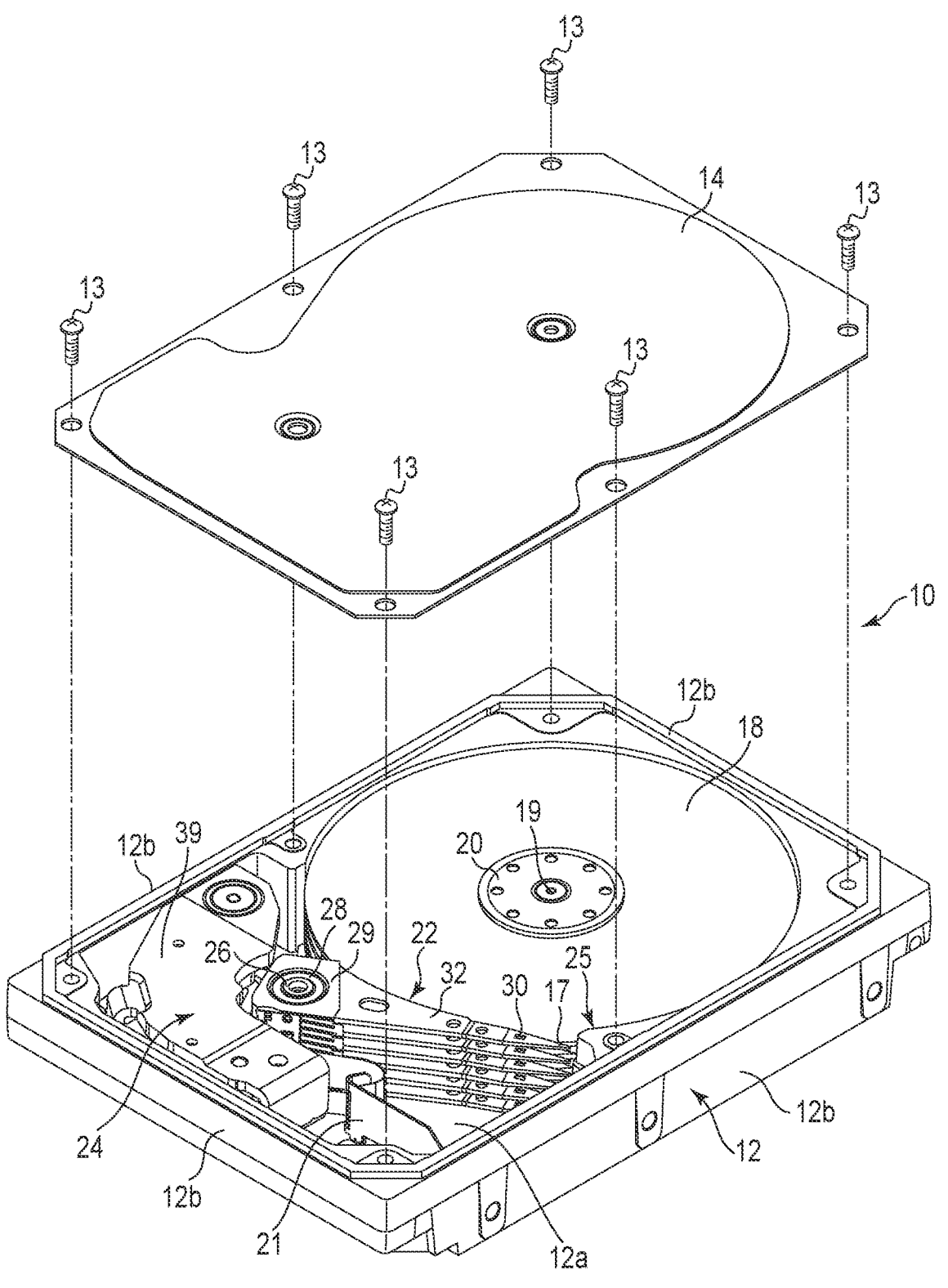
FIG. 1 is a perspective view showing a hard disk drive (HDD) according to the first embodiment.

FIG. 1 is a perspective view of the HDD of the first embodiment when a top cover thereof is removed.

As shown in the figure, the HDD comprises a rectangular-shaped housing 10. The housing 10 includes a rectangular box-shaped base 12 whose upper surface is open, and a top cover 14. The base 12 includes a rectangular bottom wall 12a and a plurality of side walls 12b each standing along a respective edge of the bottom wall 12a, and is molded to be integrated as one body from, for example, aluminum. The top cover 14 is formed into a rectangular plate shape, for example, of stainless steel. The top cover 14 is screwed onto the side walls 12b of the base 12 with a plurality of screws 13 to close the opening of the upper portion of the base 12.

In the housing 10, there are a plurality of magnetic disks 18 as disk-shaped recording media and a spindle motor 19 that supports and rotates the magnetic disks 18. The spindle motor 19 is disposed on the bottom wall 12a. Each magnetic disk 18 is formed as a round disk having a diameter of, for example, 96 mm (3.5 inches), made of a non-magnetic material, for example, glass or aluminum, and includes a substrate and magnetic recording layers formed on upper and/or lower surface of the substrate. The magnetic disks 18 are fitted to a hub, not shown, of the spindle motor 19 so as to be coaxial with respect to each other and are further clamped by a clamping spring 20. With this structure, the magnetic disks 18 are supported in a state that they are positioned parallel to the bottom wall 12a of the base 12. These magnetic disks 18 are rotated by the spindle motor 19 at a predetermined speed.

In this embodiment, for example, five magnetic disks 18 are disposed in the housing 10, but the number of magnetic disks 18 is not limited to this, and may be four or fewer, or six or more.

In the housing 10, there are a plurality of magnetic heads 17 that write and read information with respect to the magnetic disks 18, and an actuator assembly 22 that supports these magnetic heads 17 in a movable manner with respect to the magnetic disks 18, respectively. Further, in the housing 10, there are provided a voice coil motor (VCM) 24 that rotates and positions the actuator assembly 22, a ramp load mechanism 25 that holds a magnetic heads 17 in an unload position away from the respective magnetic disk 18 when the magnetic head 17 moves to the outermost circumference of the respective magnetic disk 18, and a substrate board unit (FPC unit) 21 on which electronic components such as conversion connectors and the like are mounted. The actuator assembly 22 and the VCM 24 constitute the head actuator. The ramp load mechanism 25 includes a ramp provided on the base 12 and a lift tab provided on the actuator assembly 22.

The actuator assembly 22 includes an actuator block 29 rotatably supported, a plurality of arms 32 extending from the actuator block 29, and a suspension assembly 30 extending from each arm 32. Each magnetic head 17 is supported at the distal end portion of the respective suspension assembly 30. Each magnetic head 17 includes a read head, a write head, an assist element, a heater and the like. The suspension assembly 30 is an assembly that includes a respective magnetic head 17 and may as well be referred to as a head suspension assembly.

A printed circuit board, not shown, is screwed to an outer surface of the bottom wall 12a of the base 12. The printed circuit board constitutes a control unit that controls the operation of the spindle motor 19 as well as those of the VCM 24 and the magnetic heads 17 via the board unit 21.

FIG. 2 is a perspective view of the actuator assembly 22 and the FPC unit 21. As shown in the figure, the actuator assembly 22 comprises an actuator block 29 with a through hole 31, a bearing unit 28 provided in the through hole 31, a plurality, for example, six arms 32 extending from the actuator block 29, ten suspension assemblies 30 attached respectively to the arms 32. A support shaft (pivot axis) 26 is provided to stand on the bottom wall 12a. The actuator block 29 is supported by the bearing unit 28, around the support shaft 26, in a rotatable manner.

In this embodiment, the actuator block 29 and the six arms 32 are molded to be integrated as one body from aluminum or the like to form a so-called E-block. The arms 32 are formed, for example, into elongated flat plates and extend from the actuator block 29 in a direction orthogonal to the support shaft 26. The six arms 32 are provided parallel to each other with a gap between them.

The actuator assembly 22 includes a support frame 33 extending from the actuator block 29 in a direction opposite to the arms 32, and by the support frame 33, the voice coil 35 is supported. As shown in FIG. 1, the voice coil 35 is located between a pair of yokes 39, one of which is fixed on the base 12. The voice coil 35, together with these yokes 39 and a magnet fixed to either one of the yokes, constitute the VCM 24.

As shown in FIG. 2, the ten suspension assemblies 30 are each mounted on a distal end portion 32a of each respective one of the arms 32. These suspension assemblies 30 include an up-head suspension assemblies that support the respective magnetic heads 17 upwardly and down-head suspension assemblies that supports the respective magnetic heads 17 downwardly. The up-head suspension assemblies and the down-head suspension assemblies are constituted by arranging the suspension assemblies 30, which have the same structure, in different vertical orientations.

The FPC unit 21 includes a substantially rectangular base portion 70, an elongated strip-shaped relay portion 72 extending from one side edge of the base portion 70, and a substantially rectangular joint portion (FPC joint portion) 74 continuously provided at the distal end portion of the relay portion 72, which are integrated as one body. The base portion 70, relay portion 72, and the joint portion 74 are formed from a flexible printed circuit board (FPC).

On one surface (outer surface) of the base portion 70, conversion connectors not shown in the figure, and electronic components such as a plurality of capacitors 73 and the like, are mounted and electrically connected to respective wiring lines not shown. On the other surface (inner surface) of the base portion 70, two metal plates 75 and 76 are attached, which serve as reinforcement plates. The base portion 70 is placed on the bottom wall 12a of the housing 10 and is screwed to the bottom wall 12a with two screws. The conversion connectors on the base 70 are connected to a control circuit board provided on the bottom surface side of the housing 10.

The relay portion 72 extends from the base portion 70 toward the actuator assembly 22. The joint portion 74 provided at the extending end of the relay portion 72 is formed into a rectangular shape having a height and a width substantially equal to those of the side surface (installation surface) of the actuator block 29. The joint portion 74 is attached to the installation surface of the actuator block 29 via a backing plate made of aluminum or the like, and is further screwed and fixed to the installation surface with the fixing screws 65. A head IC (head amplifier) 59 is mounted on the joint portion 74. The joint portion 74 is provided with a pair of connection pads 55 and a group of many connection pads not shown. The head IC 59 is connected to the connection pad group and the base portion 70 via a plurality of wiring lines not shown. The voice coil 35 is connected to the connection pads 55. To the connection pad group, a connection end portion 42c of the flexure 42, which will be described later, is connected.

Next, an example of the suspension assembly 30 will be described in detail.

Figure 3:
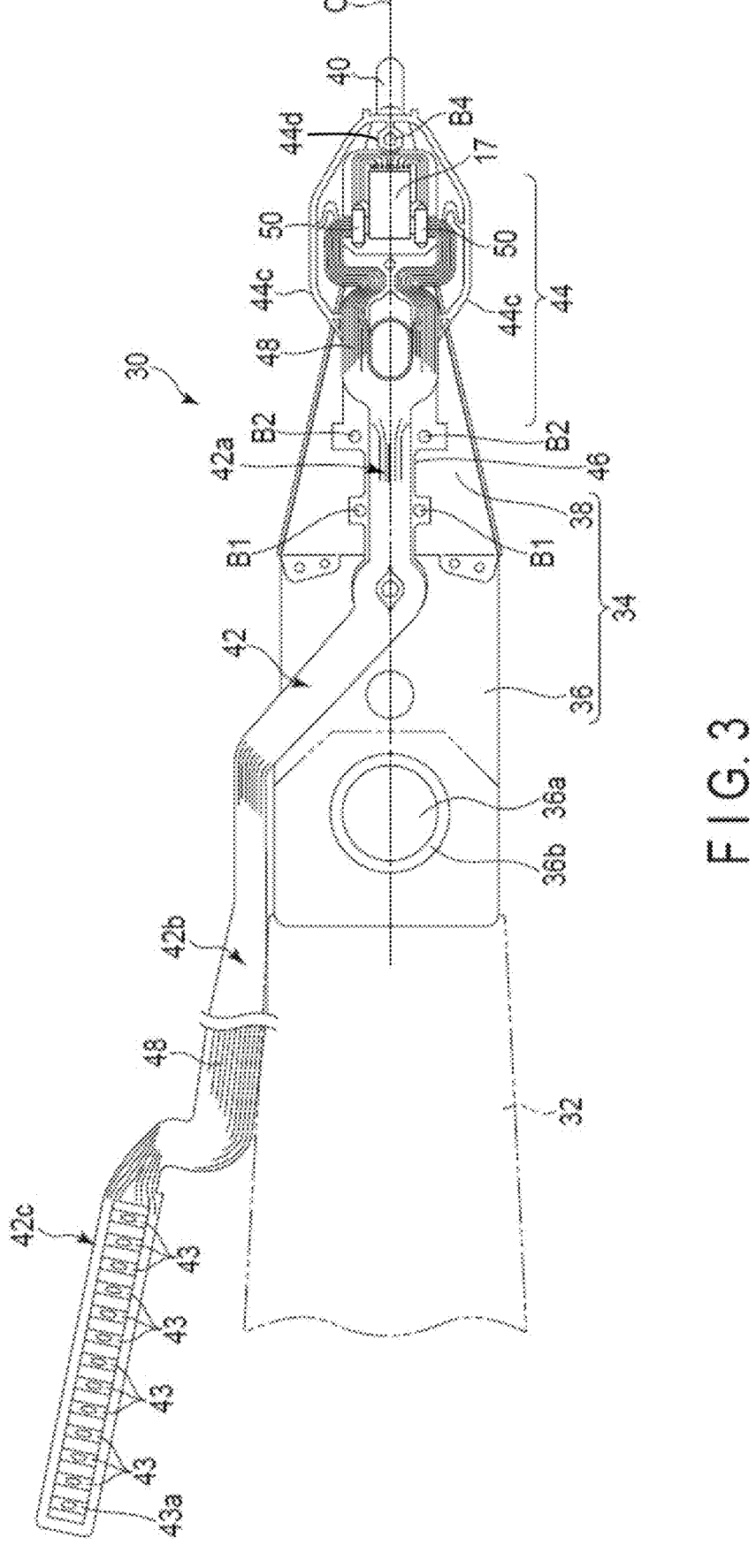
FIG. 3 is a plan view showing one head suspension assembly of the actuator assembly.

FIG. 3 is a plan view showing the head suspension assembly, and FIG. 4 is an enlarged plan view showing the distal end portion of the head suspension assembly.

As shown in FIG. 3, the suspension assembly 30 includes a suspension 34 extending from the respective arm 32, and the magnetic head 17 is attached to the distal end portion of the suspension 34. The suspension 34, which functions as a support plate, includes a rectangular base plate 36 made from a metal plate and an elongated plate spring-like load beam 38 made from a metal plate. The load beam 38 is arranged so that its proximal end portion overlaps the distal end portion of the base plate 36 and is secured to the base plate 36 by welding in several places. The distal end portion of the load beam 38 constitutes the distal end portion of the support plate, and the proximal end portion of the load beam 38 and the base plate 36 constitute the proximal end portion of the support plate. The load beam 38 is tapered to narrow down and is provided with a bar-shaped lift tab 40 protruding from the distal end portion.

The base plate 36 includes a circular opening 36*a* at its proximal end portion and an annular projection portion 36*b* located around the opening 36*a*. The base plate 36 is fastened to the distal end portion 32*a* of the arm 32 by fitting the projection portion 36*b* into a circular caulking hole 37 (see FIG. 2) formed in a caulking seat surface of the arm 32 and caulking this projection portion 36*b*. The base plate 36 may be fixed to the distal end portion 32*a* of the arm 32 by laser welding, spot welding or gluing.

The suspension assembly 30 includes an elongated strip-shaped flexure (wiring member) 42 for transmitting record signals, reproduction signals, and drive signals for the piezoelectric elements, and a pair of piezoelectric elements (for example, PZT elements) 50 mounted on the flexure 42. The flexure 42 includes a distal end-side portion 42*a* disposed on the load beam 38 and the base plate 36, a proximal end-side portion 42*b* extending outward from the side edge of the base plate 36 to the actuator block 29 along the side edge of the arm 32, a connection end portion (tail connection end portion) 42*c* extending from the extending end of the proximal end-side portion 42*b*. The connection end portion 42*c* includes a plurality of connection terminals (electrode pads) 43 arranged side by side in a row. These connection terminals 43 are electrically connected to a group of connection pads of the joint portion 74 installed in the actuator block 29.

The flexure 42 includes a thin metal plate (metal plate) 46 of, for example, stainless steel, as a base, and a strip-shaped wiring substrate (flexible printed circuit board: FPC) 48 attached or fixed to the metal plate 46, forming an elongated stacked layered board. The wiring substrate (FPC) 48 includes a base insulating layer, a most of which is fixed to the metal plate 46, a conductive layer (wiring pattern) formed on the base insulating layer, and a cover insulating layer stacked on the base insulating layer so as to cover the conductive layer. For example, copper foil is used as the conductive layer, and by patterning this copper foil, a plurality of wiring lines (signal wiring lines, drive wiring lines, and ground wiring lines), a plurality of connection pads, and a plurality of connection terminals are formed.

As shown in FIGS. 3 and 4, at the distal end portion side portion 42*a* of the flexure 42, the metal plate 46 is attached or spot-welded onto the surfaces of the load beam 38 and the base plate 36 at a plurality of welding points. In one example, the distal end portion of the metal plate 46 includes six welding points (first welding points) B1, B2, and B3 (see FIG. 4) welded to the proximal end portion of the load beam 38 and one welding point (second welding point) B4 welded to the distal end portion of the load beam 38.

The distal end portion of the flexure 42 is located on the distal end portion of the load beam 38 and constitutes a gimbal portion 44 that serves as an elastic support portion. The magnetic head 17 is placed and secured on the gimbal portion 44 and is supported by the load beam 38 via the gimbal portion 44. The pair of piezoelectric elements 50, which constitute a micro actuator, are mounted on the gimbal portion 44 and are located on respective sides of the magnetic head 17.

As shown in FIG. 4, in the gimbal portion 44, the metal plate 46 includes a substantially rectangular tongue portion (support portion) 44*a* located on the distal end portion side of the load beam 38, a proximal end-side portion 44*b* located to be spaced from the tongue portion 44*a* on the proximal end-side portion of the load beam 38, a pair of outriggers 44*c* each extending from the proximal end-side portion 44*b* to the distal end portion of the load beam 38 through respective outer sides of the tongue portion 44*a* and connected with each other on the distal end portion side, and a substantially rectangular-shaped fixation pad 44*d* extending from the distal end portion of the outriggers 44*c* toward the tongue portion 44*a* and opposing the distal end portion of the tongue portion 44*a*, which are integrated into one body. The fixation pad 44*d* constitutes the distal end portion of the outriggers 44*c*. Each of the outriggers 44*c* includes a spring-like connecting portion 44*e* which connects its longitudinal middle portion to the tongue portion 44*a*, as one integrated body.

The proximal end portion 44*b* of the metal plate 46 is attached over the surface of the load beam 38 and welded to the load beam 38 at the welding points B1, B2, and B3 described above. The fixation pad 44*d* is disposed to overlap the load beam 38 (overlap in a direction substantially perpendicular to the surface of the load beam 38) between the distal end portion of the outrigger 44*c* and the tongue 44*a* and is welded to the load beam 38 at the welding point B4 described above. In one example, the welding point B4 is located on the central axial line C of the suspension 34.

Each of the outriggers 44*c* is formed to have a substantially constant width W1, except for a root portion 45 connected to the proximal end-side portion 44*b*, and is elastically deformable, as will be described later. The pair of outriggers 44*c* connect the proximal end portion 44*b* and the tongue portion 44*a* with each other and also supports the tongue portion 44*a* in a displaceable manner. The respective magnetic head 17 is mounted and secured to the tongue portion 44*a*.

The tongue portion 44*a* is brought in contact, by its substantially central portion, with a dimple (projecting portion) 52 protruding from the distal end portion of the load beam 38. The tongue 44*a* can be displaced in various directions using the dimple 52 as a fulcrum by way of elastic deformation of the pair of outriggers 44*c*. As a result, the magnetic head 17 mounted on the tongue portion 44*a* can flexibly follow the surface variation of the magnetic disk 18 and displace in the roll or pitch direction to maintain a micro gap between the surface of the magnetic disk 18 and the magnetic head 17.

In the gimbal portion 44, the wiring substrate 48 of the flexure 42 is disposed on the metal plate 46 and extends from the proximal end portion 44*b* to above the tongue portion 44*a* along the central axial line C of the suspension assembly 30. In other words, the wiring substrate 48 includes a proximal end-side portion 48*a* attached onto the proximal end portion 44*b*, a distal end portion 48*b* attached to the tongue portion 44*a*, and a pair of strip-shaped bridge portions 48*c* extending in a two-way fashion from the proximal end portion 48*a* to the distal end portion 48*b*. The magnetic head 17 and the piezoelectric element 50 are mounted on the distal end portion 48*b*. The magnetic head 17 is placed on the tongue portion 44*a* and partially mounted on the distal end portion 48*b*. The pair of piezoelectric elements 50 are each located on the bridge section 48c and on respective sides of the magnetic head 17 in the width direction.

A plurality of connection pads (electrode pads) 53 are provided side by side in a row along the width direction on the distal end portion 48b. Further, the distal end portion 48b is provided with a plurality of connection pads (electrode pads), not shown, for connecting the piezoelectric elements 50. The wiring substrate 48 includes a plurality of signal wiring lines WL extending from the connection pads 53 around respective side edge portions of the distal end portion 48b towards the proximal end portion 48a, and a plurality of signal wiring lines WL extending from the connection pads towards the proximal end portion 48a. These signal wiring lines WL extend over substantially the entire length of the flexure 42 and are connected to a plurality of connection terminals 43 provided at the connection end portion 42c (see FIG. 3).

As shown in FIG. 4, the magnetic head 17 includes a substantially rectangular-shaped head slider, a recording element (write head), a read element (read head), and an assist element (heater), not shown, provided on the head slider. The magnetic head 17 is mounted on the tongue portion 44a and on the distal end portion 48b. The recording element (write head), the read element (read head), and the assist element (heater) are electrically connected to a plurality of connection pads 53 on the distal end portion 48b via wiring lines, electrodes, and conductive adhesive, which are not shown. Thus, the magnetic head 17 is connected to the signal wiring lines WL of the circuit board 48 via the connection pads 53.

For the pair of piezoelectric elements 50, for example, rectangular plate-shaped thin-film piezoelectric elements (PZT elements) are used. The piezoelectric elements 50 are not limited to a thin-film type (about 10 μm thick), but a bulk or bulk stacked type (40 μm or thicker) piezoelectric element may as well be used. Further, the piezoelectric elements 50 are is not limited to PZT elements, but other piezoelectric elements may as well be used. Furthermore, the drive element is not limited to a piezoelectric element, but other types of drive elements may as well be used, for example, that can expand and contract by the application of electric current.

The piezoelectric elements 50 are arranged so that their longitudinal direction (expansion/contraction direction) is parallel to the central axial line C of the suspension 34. The two piezoelectric elements 50 are arranged on respective sides of the magnetic head 17 in the width direction, so as to be side by side parallel to each other.

The suspension assembly 30 comprises a viscoelastic material (which may as well be referred to as a damper) 60 provided in an overlapping portion of the outriggers 44c, which is a location which overlaps the load beam 38. The root portion 45 of the outrigger 44c, which connects to the proximal end portion 44b of the metal plate 46, is located to overlap the load beam 38. In other words, the root portion 45 constitutes an overlapping portion that is positioned perpendicular to the surface of the load beam 38. In this embodiment, a viscoelastic material (damper) 60 is provided in each of a pair of root portions 45.

Figure 7:
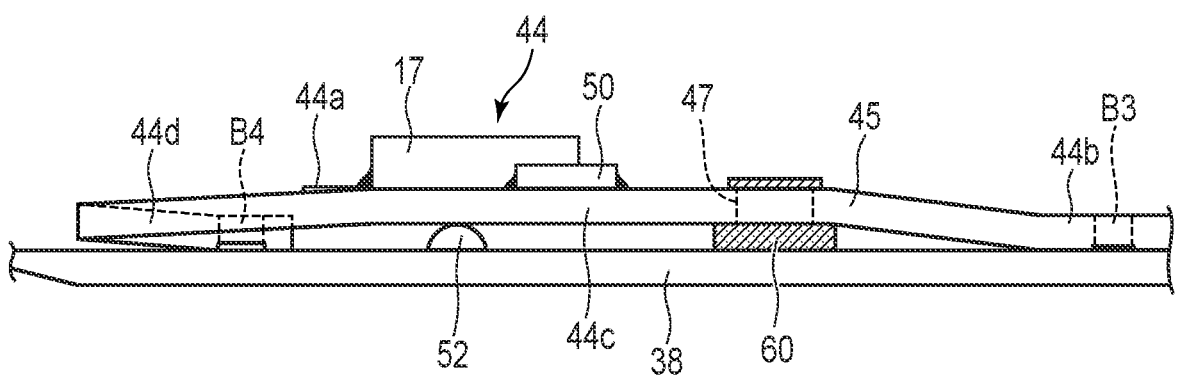
FIG. 7 is a side view schematically showing the distal end portion and the gimbal portion of the suspension assembly.

FIG. 5 is an enlarged plan view of a root portion of the outrigger, before being filled with a viscoelastic material, and FIG. 6 is an enlarged plan view of the root portion of the outrigger, after filled with a viscoelastic material. FIG. 7 is a side view schematically showing the gimbal portion of the suspension assembly.

As shown in FIG. 5, the root portion 45 of the outriggers 44c has a width W2 greater than the width W1 of the other portion of the outrigger 44c. In one example, the root portion 45 has substantially a triangular shape that gradually narrows in width from the proximal end portion 44b to the extending side of the outrigger 44c. The root portion 45 as an overlapping portion is located to overlap the load beam 38. In other words, the root portion 45 opposes the surface of the load beam 38 with a gap therebetween. The root portion 45 is provided with a substantially triangular through hole 47. The through hole 47 opposes the load beam 38. It suffices if the through hole 47 is formed to have an area smaller than the area of the root portion 45, and its shape is not limited to a triangle, but can be any other shape, such as circular, oval or the like.

As shown in FIGS. 6 and 7, via the through hole 47, the gap between the root portion 45 of the outrigger and the load beam 38 is filled with a viscoelastic material 60. The viscoelastic material 60 is held in the gap described above, in the through hole 47, and on the surface side of the root portion 45, spread over the area surrounding the through hole 47. The viscoelastic material 60 forms a damper with the load beam 38 as a restraining layer, and has an effect, by its viscosity, attenuates the vibration of the outrigger 44c. For example, a resin adhesive such as a thermosetting adhesive can be used as the viscoelastic material 60.

As shown in FIG. 7, when the metal plate 46 of the flexure 42 is welded to the load beam 38, the pair of outriggers 44c are pulled up as the tongue portion 44a is brought into contact with the dimples 52 of the load beam 38, thus creating a gap between the load beam 38 and the root portions 45 of the outriggers 44c. The viscoelastic material 60 filled into the gap described above via the through hole 47 spreads out in the gap described above and expands beyond the outer edge of the through hole 47. In other words, in the above-described gap, the viscoelastic material 60 spreads over an area larger than the area of the through hole 47. As a result, the viscoelastic material 60 is adhered tightly to the surface of the load beam 38 and the opposing surface around the through hole 47 of the root portion 45 in the above-described gap.

Note that on the upper surface side and lower surface side of the root portion 45, the viscoelastic material 60 should preferably spread so as not to exceed beyond the side edges of the root portions 45.

According to the suspension assembly 30 configured as described above, the viscoelastic material 60 is filled in the site where the load beam 38 and the outriggers 44c overlap, that is, for example, between those of the root portions 45. The viscosity of the viscoelastic material 60 acts as a damper against the torsional mode of the gimbal portion and thus can suppress the occurrence of the torsional mode. With this structure, it is possible to improve the positioning accuracy of the magnetic head.

FIG. 8 shows is a diagram showing a comparison in vibration characteristics between the suspension assembly (with a damper) of the embodiment and a suspension assembly (without a damper) of a comparison example. As shown in the figure, in the suspension assembly of the comparative example, a vibration mode occurs, in which the gimbal is twisted around 10 kHz. By contrast, it can be understood that in the suspension assembly of this embodiment, the vibration around 10 kHz is attenuated and the torsional vibration mode of the gimbal is suppressed.

Further, according to the suspension assembly 30 of this embodiment, the viscoelastic material 60 is provided only at the root portions of the outriggers 44c. With this structure, the effect of improving the positioning accuracy described above can be achieved while suppressing the risk of increased mass and contamination of the gimbal portion. With the structure in which the through hole 47 is provided in the outrigger 44c to fill the gap with the viscoelastic material 60 through the through hole 47, the viscoelastic material 60 can be provided between the outriggers 44c and the load beam 38 after the metal plate 46 is positioned and fixed to the load beam 38 by welding. Therefore, the damper can be provided without degrading the existing assembly accuracy and manufacturability of the suspension assembly 30. Further, in each of the outriggers 44c, the site where the through hole 47 is provided is formed wider than the other portions. With this configuration, even when the through hole 47 is provided, the strength of the outriggers 44c is not reduced. Further, the damper structure can be formed without changing the gap between the outriggers 44c and the load beam 38, and therefore the effect on other vibration modes can be suppressed.

As described above, according to this embodiment, it is possible to provide a suspension assembly which can improve the positioning accuracy of the head and a disk device comprising this suspension assembly.

Next, the suspension assembly of the HDD according to other embodiments will be described. In the other embodiments described below, parts identical to those of the first embodiment described above will be designated by the same reference symbols, and detailed descriptions thereof will be omitted or simplified. That is, the descriptions will be focused on parts that differ from those of the first embodiment.

Second Embodiment

FIG. 9 is an enlarged plan view of a distal end portion of a suspension assembly according to the second embodiment.

As shown in the figure, according to the second embodiment, the viscoelastic material 60 is disposed in the distal end portions of the outriggers 44c, that is, of the overlapping portions of the outriggers 44c, which overlap the load beam 38, here, at the proximal end portion of a fixation pad 44d, so as to form a damper.

FIG. 10 is an enlarged plan view of the distal end portions of the outriggers, before being filled with a viscoelastic material, and FIG. 11 is an enlarged plan view of the distal end portion of the outriggers, after filled with a viscoelastic material. FIG. 12 is a side view schematically showing the gimbal portion of the suspension assembly.

As shown in FIG. 10, the fixation pad 44d, connected to be integrated with the proximal end portions of the outriggers 44c, is located to overlap the load beam 38 and is welded to the load beam 38 at a welding point B4. The proximal end portion of the fixation pad 44d connected to the outriggers 44c has a width W3 greater than the width W1 of the other portions of the outriggers 44c. The proximal end portion opposes the load beam 38 with a gap therebetween. A substantially rectangular through hole 51 is provided in the proximal end portion of the fixation pad 44d. It suffices only if the through hole 51 is formed in an area smaller than the area of the proximal end portion, and its shape is not limited to a rectangular shape, but may be any other shape.

As shown in FIGS. 11 and 12, via the through hole 51, the gap between the distal end portions of the outriggers 44c and the load beam 38 is filled with a viscoelastic material 60. The viscoelastic material 60 is held in the above-described gap, in the through hole 51, and on the surface side of the fixation pad 44d, spread over the area surrounding the through holes 51. The viscoelastic material 60 forms a damper with the load beam 38 as a restraining layer, and has a function by its viscosity, of attenuating the vibration of the outriggers 44c.

As shown in FIG. 12, when the fixation pad 44d is welded to the load beam 38, the tongue portion 44a is brought into contact with the dimple 52 of the load beam 38, so as to pull up the proximal end portions of the pair of outriggers 44c and the fixation pad 44d. Thus, a gap is created between the proximal end portion of the fixation pad 44d and the load beam 38. The viscoelastic material 60 filled into the above-described gap from the through hole 51 spreads into the above-described gap and spreads to the outer side of the outer edge of the through hole 51. In other words, in the above-described gap, the viscoelastic material 60 spreads over an area larger than the area of the through hole 51. As a result, the viscoelastic material 60 is adhered tightly to the surface of the load beam 38 and the opposing surface around the through hole 51 of the fixation pad 44D in the above-described gap.

Note that on the upper and lower sides of the proximal end portion of the fixation pad 44d, the viscoelastic material 60 should preferably spread so as to not go beyond the side edges of the outriggers 44c including the fixation pad 44d.

According to the suspension assembly 30 configured as described above, the viscoelastic material 60 is filled between the distal end portions of the outriggers 44c and the load beam 38. The viscosity of the viscoelastic material 60 acts as a damper against the torsional mode of the gimbal portion, thereby suppressing the occurrence of the torsional mode. With this structure, it is possible to improve the positioning accuracy of the magnetic head. Apart from this, in the suspension assembly of the second embodiment, advantageous effects similar to those of the suspension assembly of the first embodiment described above can be obtained.

As described above, according to the second embodiment, it is possible to provide a suspension assembly which can improve the positioning accuracy of the head and a disk device comprising this suspension assembly.

Third Embodiment

FIG. 13 is a cross-sectional view schematically showing the filling portion of the viscoelastic material in a suspension assembly of an HDD according to the third embodiment.

As shown in the figure, in the third embodiment, an annular recess (or groove) 64 is provided on the surface side of the load beam 38, for example, in the area to be filled with the viscoelastic material 60. The recess (or groove) 64 is formed, for example, by etching.

The viscoelastic material 60 filled between the outriggers 44c and the load beam 38 spreads to the location of the recess 64 and is disposed in such a state in which the peripheral portion thereof is positioned within the recess 64. With the recess 64 thus provided, excessive spreading of the viscoelastic material 60 is regulated. With this structure, it is possible to place the viscoelastic material 60 in a desired location and into a desired size, thereby forming a damper having the desired vibration damping action.

In the suspension assembly of the third embodiment, other configurations are similar to those of the suspension assembly of the first embodiment described above. Therefore, in the suspension assembly of the third embodiment, advantageous effects similar to those of the above-mentioned suspension assembly of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes, dimensions, etc., of the elements which constitute the suspension assembly are not limited to those of the embodiments described above, but can be changed in various ways as necessary. The piezoelectric elements are not limited to a pair, but may be one, or even three or more. The location of the viscoelastic material is not limited to the root portion or distal end portion of the outrigger, but may be provided at any other location that overlaps with the load beam, that is, any location that opposes the load beam with a gap.

What is claimed is:

1. A suspension assembly comprising:
a support plate;
a wiring member provided on the support plate and comprising an elastically deformable gimbal portion including a tongue portion on which a magnetic head is mounted and an outrigger connected to the tongue portion, the outrigger including an overlapping portion located to overlap the support plate and a through hole made in the overlapping portion and opposing the support plate; and
a viscoelastic material filled into a gap between the overlapping portion and the support plate and into the through hole and constituting a damper.

2. The suspension assembly of claim 1, wherein the overlapping portion has a width greater than a width of an other portion of the outrigger.

3. The suspension assembly of claim 2, wherein the support plate comprises a recess provided at a location opposing the overlapping portion of the outrigger and regulating spreading of the viscoelastic material.

4. The suspension assembly of claim 1, wherein the outrigger includes a root portion located on a proximal end side with respect to the tongue portion and a distal end portion located on a distal end side with respect to the tongue portion, and the root portion constitutes the overlapping portion.

5. The suspension assembly of claim 1, wherein the outrigger includes a root portion located on a proximal end side with respect to the tongue portion and a distal end portion located on a distal end side with respect to the tongue portion, and the distal end portion constitutes the overlapping portion.

6. A disk device comprising:
a disk-shaped recording medium including a recording layer; and
a head actuator including a suspension assembly,
the suspension assembly comprising:
a support plate;
a wiring member provided on the support plate, comprising: an elastically deformable gimbal portion including a tongue portion on which a magnetic head is mounted and an outrigger connected to the tongue portion; and
a viscoelastic material filled into a gap between the outrigger and the support plate to form a damper, wherein
the outrigger includes an overlapping portion located to overlap the support plate and a through hole made in the overlapping portion and opposing the support plate, and
the viscoelastic material is filled into the gap between the overlapping portion and the support plate and into the through hole.

7. The disk device of claim 6, wherein the overlapping portion has a width greater than a width of an other portion of the outrigger.

8. The disk device of claim 7, wherein the support plate comprises a recess provided at a location opposing the overlapping portion of the outrigger to regulate spreading of the viscoelastic material.

9. The disk device of claim 6, wherein the outrigger includes a root portion located on a proximal end side with respect to the tongue portion and a distal end portion located on a distal end side with respect to the tongue portion, and the root portion constitutes the overlapping portion.

10. The disk device of claim 6, wherein the outrigger includes a root portion located on a proximal end side with respect to the tongue portion and a distal end portion located on a distal end side with respect to the tongue portion, and the distal end portion constitutes the overlapping portion.

* * * * *